United States Patent [19]

Lash

[11] Patent Number: 5,243,885
[45] Date of Patent: Sep. 14, 1993

[54] FACE DRIVING CENTER ASSEMBLY FOR LATHE

[75] Inventor: Richard F. Lash, New Haven, Ind.
[73] Assignee: Dana Corporation, Toledo, Ohio
[21] Appl. No.: 701,521
[22] Filed: May 16, 1991
[51] Int. Cl.⁵ .............................................. B23B 33/00
[52] U.S. Cl. .......................................... 82/165; 142/53
[58] Field of Search .................. 82/165, 1.11; 142/53; 279/1 E, 15, 132, 133; 269/310

[56] References Cited

U.S. PATENT DOCUMENTS

| | | | |
|---|---|---|---|
| 1,239,027 | 9/1917 | Mentzer | 142/53 |
| 1,361,120 | 12/1920 | Weatherby | 82/165 |
| 2,333,055 | 10/1943 | Terrell | 142/53 |
| 3,404,763 | 10/1968 | Reed | 142/53 X |
| 3,518,904 | 7/1970 | Rohm | 82/165 X |
| 4,125,042 | 11/1978 | Barron | 82/165 |
| 4,677,885 | 7/1987 | Schmid et al. | 82/165 |

FOREIGN PATENT DOCUMENTS 2741777  3/1979  Fed. Rep. of Germany ........ 82/165

*Primary Examiner*—Z. R. Bilinsky
*Attorney, Agent, or Firm*—MacMillan, Sobanski & Todd

[57] ABSTRACT

A face driving center assembly adapted for use in a lathe includes a shank adapted to be secured to the lathe for rotation therewith. In a first embodiment, a face driver is directly connected to the shank for rotation therewith. The face driver has a forward surface which is provided with a plurality of workpiece-engaging teeth. A center is slidably mounted in aligned bores formed through the shank and the face driver. The center is spring biased forwardly to engage and guide the workpiece as it is installed in the lathe. The teeth driving engage a flat end surface of the workpiece to be machined so as to cause the workpiece to rotate with the assembly during use. A pin disposed in a transverse bore formed in the face driver cooperates with a slot formed in the outer surface of the center to limit the sliding movement thereof. In a second embodiment, the face driver is connected to the shank through a universal joint structure. The universal joint structure permits the assembly to be used for machining workpieces having end faces which are not formed precisely perpendicular to the axis of rotation.

8 Claims, 3 Drawing Sheets

FACE DRIVING CENTER ASSEMBLY FOR LATHE

BACKGROUND OF THE INVENTION

This invention relates in general to lathes and in particular to an improved structure for a face driving center assembly adapted for use with such lathes.

The lathe is one of the most basic of all of the metal and wood working tools. Lathes are designed to support a workpiece between centers or in a chuck and to rotate the workpiece relative to a non-rotating cutting tool. During such rotation, the tool is moved into engagement with the workpiece. As a result, material is selectively removed from the workpiece in order to form the outer surface thereof into a desired shape or profile. Cylindrical and conical articles, such as pins, bolts, shafts, discs, and the like, are often formed or precisely machined on lathes.

For machining certain workpieces, such as vehicle axles and the like having relatively large and substantially flat end faces, it is known to use a face driving center assembly in the lathe. The typical face driving center assembly includes a plurality of teeth or serrations which engage the flat end face of the workpiece to provide a driving connection therebetween. Thus, rotation of the assembly by the lathe causes corresponding rotation of the workpiece. Although several different structures for such face driving center assemblies are known, they have been found to be complicated and expensive in structure and operation. Also, known face driving center assemblies have been found to be unsuitable for use when the end face of the workpiece to be machined is not formed precisely perpendicular to the axis of rotation in the lathe.

SUMMARY OF THE INVENTION

This invention relates to an improved structure for a face driving center assembly adapted for use in a lathe. The assembly includes a shank adapted to be secured to the lathe for rotation therewith. In a first embodiment, a face driver is directly connected to the shank for rotation therewith. The face driver has a forward surface which is provided with a plurality of workpiece-engaging teeth. A center is slidably mounted in aligned bores formed through the shank and the face driver. The center is spring biased forwardly to engage and guide the workpiece as it is installed in the lathe. The teeth drivingly engage a flat end surface of the workpiece to be machined so as to cause the workpiece to rotate with the assembly during use. A pin disposed in a transverse bore formed in the face driver cooperates with a slot formed in the outer surface of the center to limit the sliding movement thereof. In a second embodiment, the face driver is connected to the shank through a universal joint structure. The universal joint structure permits the assembly to be used for machining workpieces having end faces which are not formed precisely perpendicular to the axis of rotation.

The objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
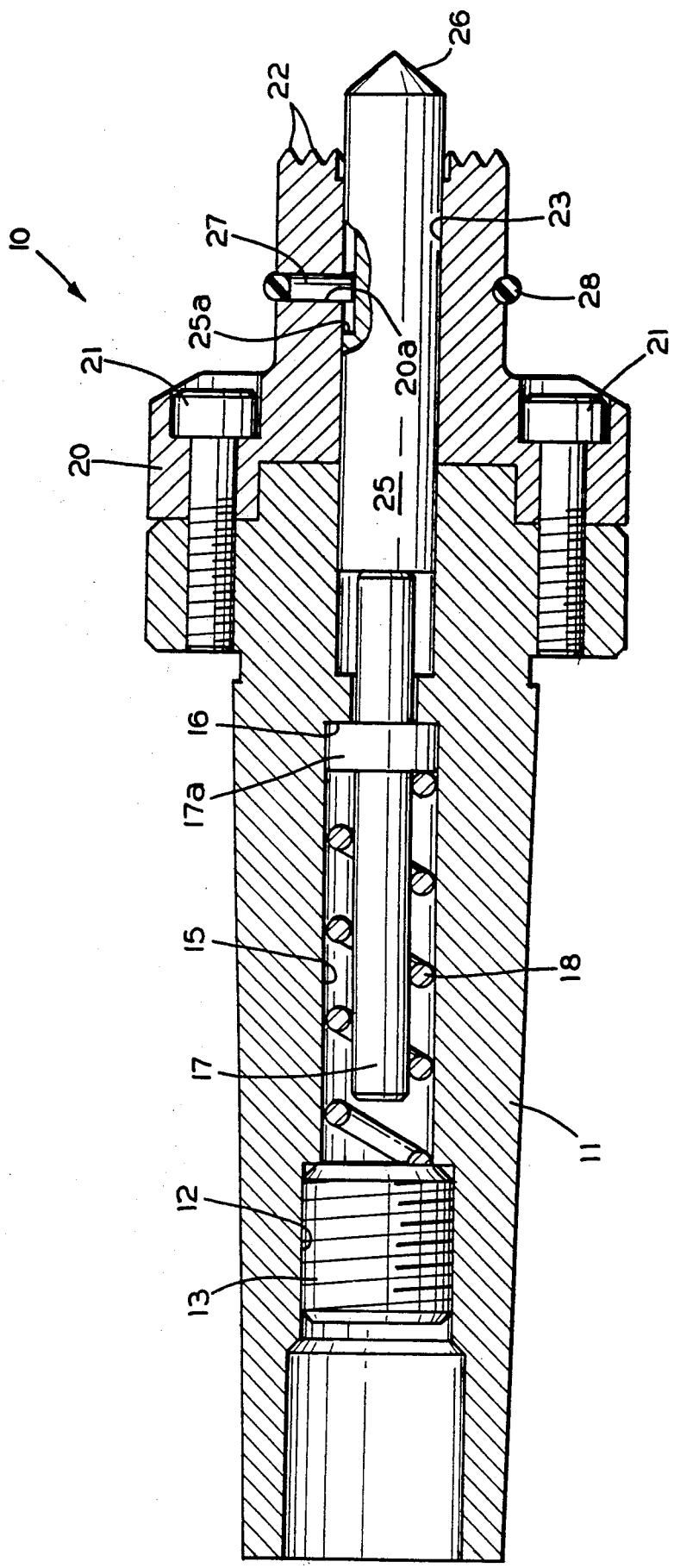
FIG. 1 is a sectional elevational view of a first embodiment of a face driving center assembly in accordance with this invention.
Figure 2:
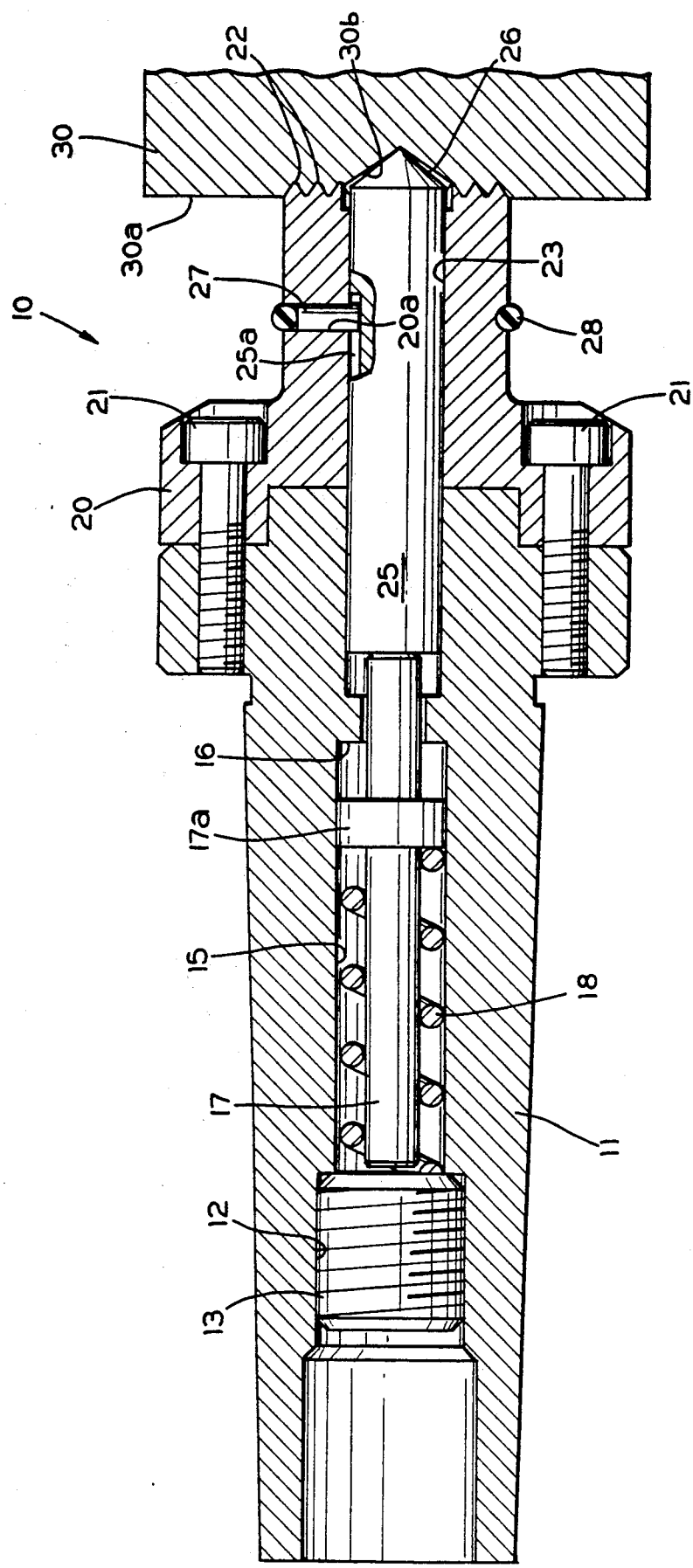
FIG. 2 is a sectional elevational view similar to FIG. 1 showing a workpiece in engagement with the face driving center assembly.

Referring now to the drawings, there is illustrated in FIGS. 1 and 2 a first embodiment of a face driving center assembly, indicated generally at 10, in accordance with this invention. The assembly 10 includes a tapered shank 11 which is adapted to be supported for driving rotation in a conventional lathe (not shown) or similar metal working machine. The shank 11 has a threaded bore 12 formed therein, within which a correspondingly threaded plug 13 is disposed.

A non-threaded bore 15 is also formed in the shank 11. The bore 15 extends co-axially from the threaded bore 13 to forward end of the shank 11. An internal circumferential shoulder 16 is formed in the non-threaded bore 15. A pin 17 including an enlarged circumferential shoulder 17a is disposed within the non-threaded bore 15. The pin shoulder 17a is disposed between the plug 13 and the internal shoulder 16 and journals the pin 17 within the bore 15 for sliding movement. A spring 18 reacts between the plug 13 and the pin shoulder 17a to urge the pin 17 toward the forward end of the shank 11.

A face driver 20 is secured to the forward end of the shank 11 by a plurality of threaded fasteners 21. The face driver 20 includes a forwardly facing surface having a plurality of teeth 22 formed thereon. The teeth 22 are preferably formed in the shape of individual tetrahedrons, each having three sides which extend to a point. The teeth 22 may be formed having other three-dimensional shapes, such as four sided pyramids. A non-threaded bore 23 is formed through the face driver 20. The face driver bore 23 is co-axially aligned with the shank bore 15. A cylindrical center 25 is disposed in the bores 15 and 23 for axial sliding movement. The forward end of the center 25 terminates in a conical tip 26. As best shown in FIG. 1, the tip 26 is normally positioned forwardly of a transverse plane defined by the teeth 22 of the face driver 20.

A transverse bore 20a is formed through the face driver 20. A pin 27 is disposed in this transverse bore 20a. The pin 27 is retained in the bore 20a by an O-ring 28 located in a circumferential groove formed about the face driver 20. The pin 27 extends into a slot 25a formed in the outer surface of the center 25. The cooperation of the pin 27 with the slot 25a permits the center 25 to move axially relative to the assembly 10 throughout a limited distance defined by the length of the slot 25a. Such cooperation also prevents the center 25 from rotating relative to the assembly 10.

In operation, the tip 26 of the center 25 is initially extended forwardly of the transverse plane defined by the teeth 22 of the face driver 20 under the urging of the spring 18, as described above. Thus, the tip 26 is exposed for guiding a workpiece 30 thereon, as shown in FIG. 1. The workpiece 30 is formed having an end face 30a which is relatively large and substantially flat. Typically, a generally conical recess 30b is formed in the center of the end face 30a co-axial with the longitudinal axis of the workpiece 30. When the workpiece 30 is installed, the end face 30a moved rearwardly toward the face driver 20. As this movement occurs, the tip 26 cooperates with the recess 30b to guide the workpiece 30 onto the assembly 10. Therefore, the workpiece 30 is precisely guided to be co-axial with the assembly 10.

Further rearward movement of the workpiece 30 causes it to move the center 25 rearwardly within the face driver 20 and the shank 11, against the urging of the spring 17. Such rearward movement continues until the end face 30a of the workpiece 30 engages the teeth 22 of the face driver 20. At that time, the teeth 22 dig into the end face 30a of the workpiece 30 to provide a secure driving connection therebetween. Thus, the assembly 10 can rotate the workpiece 30 to permit the lathe to be used. It will be appreciated, therefore, that the slot 25a must be formed having a length which is sufficiently long to permit the center 25 to be moved rearwardly in this manner. If the slot 25a is not long enough, the center 25 will not be fully retracted. Consequently, the teeth 22 will not sufficiently engage the workpiece to securely drive it for rotation.

When the machining process is completed by the lathe, the workpiece 30 is moved axially forwardly, thereby disengaging the teeth 22 from the end face 30a and permitting removal of the workpiece 30. When the workpiece 30 is removed, the spring 18 urges the pin 17 and the center 25 forwardly back to the position illustrated in FIG. 1 in preparation for the next workpiece to be machined.

The first embodiment of the face driving center assembly 10 thus far described has been found to function satisfactorily when the end face 30a of the workpiece 30 is formed very closely perpendicular to the axis of rotation of the assembly 10 and the lathe. However, in many instances, this end face 30a is not so precisely formed. When this occurs, the assembly 10 and the workpiece 30 wobble when rotated.

Figure 3:
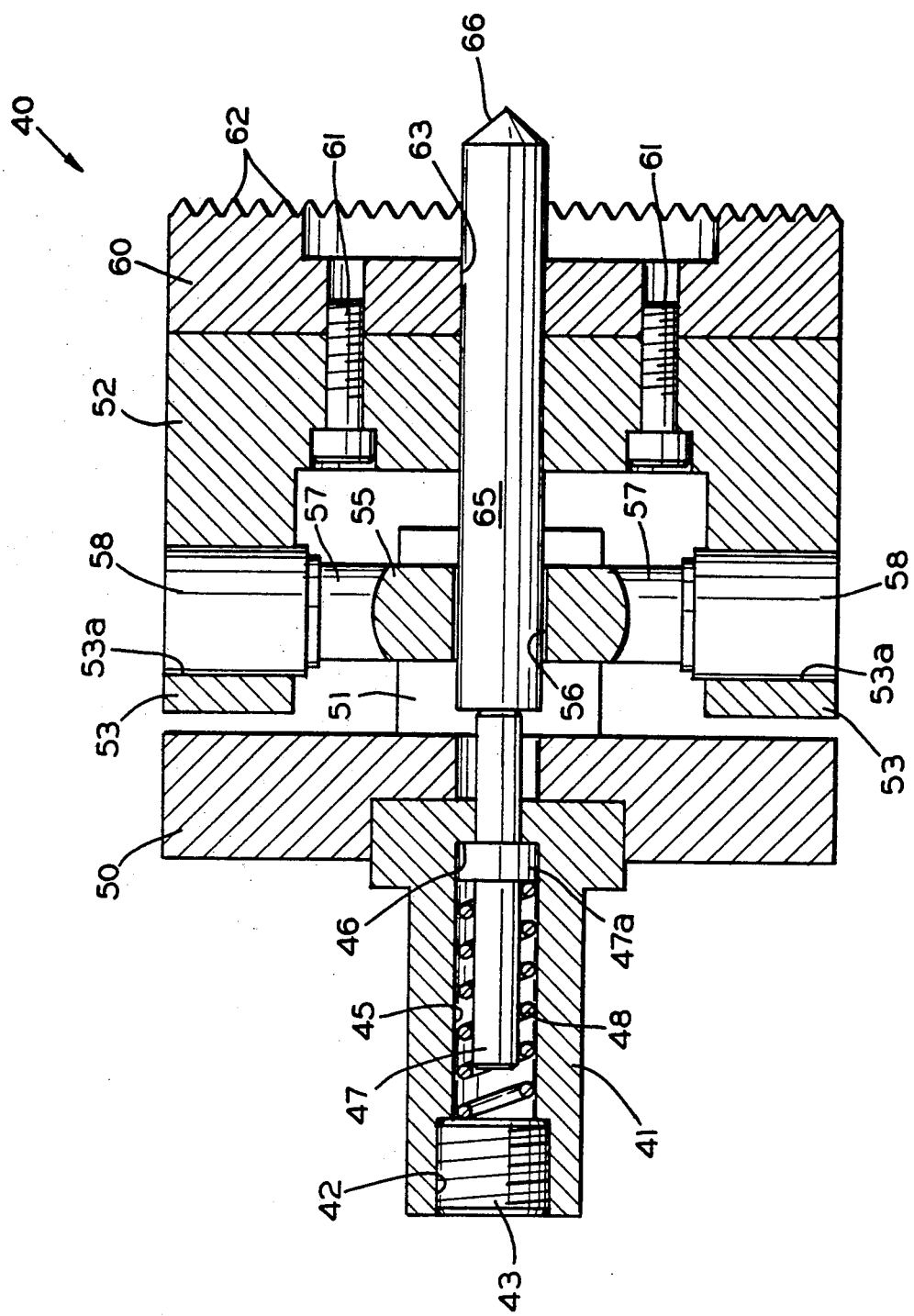
FIG. 3 is a sectional elevational view of a second embodiment of a face driving center assembly in accordance with this invention.

To address this problem, a second embodiment of a face driving center assembly, indicated generally at 40 in FIG. 3 has been developed. The assembly 40 includes a shank 41 which is adapted to be supported for driving rotation in the lathe (not shown). The shank 41 has a threaded bore 42 formed therein, within which a correspondingly threaded plug 43 is disposed. A non-threaded bore 45 is also formed in the shank 41. The bore 45 extends co-axially from the threaded bore 43 to forward end of the shank 41. An internal circumferential shoulder 46 is formed in the non-threaded bore 45. A pin 47 including an enlarged circumferential shoulder 47 is disposed within the non-threaded bore 45. The pin shoulder 47a is disposed between the plug 43 and the internal shoulder 46 and journals the pin 47 within the bore 45 for sliding movement. A spring 48 reacts between the plug 43 and the pin shoulder 47a to urge the pin 47 toward the forward end of the shank 41.

The forward end of the shank 41 is connected to a first yoke 50 having a pair of arms 51 (only one is illustrated). This connection is accomplished by forming a threaded outer surface on the forward end of the shank 41 which cooperates with a corresponding threaded inner surface of a recess formed in the first yoke 50. A second yoke 52 is also provided with a pair of arms 53. The pairs of arms 51 and 53 are each provided with aligned pairs of apertures (only the second pair of apertures 53a is illustrated). A universal joint cross 55 is provided for connecting the first yoke 50 to the second yoke 52. A central aperture 56 is formed through the cross 55 for a purpose which will be explained below.

The cross 55 includes opposed pairs of outwardly extending trunnions 57 (only two are illustrated). A bearing cup 58 is rotatably mounted on the end of each of the trunnions 57 by a cylindrical bushing (not shown) or similar bearing means. The bearing cups 58 are received in the apertures 51a and 53a formed through arms 51 and 53 of the first and second yokes 50 and 52, respectively. Thus, rotation of the shank 41 by the lathe causes corresponding rotation of the first and second yokes 50 and 52 while permitting such yokes 50 and 52 to be angled relative to one another.

A face driver 60 is secured to the forward end of the second yoke 52 by a plurality of threaded fasteners 61. The face driver 60 includes a forwardly facing surface having a plurality of teeth 62 formed thereon. The teeth 62 are also formed generally in the shape of individual tetrahedrons or pyramids. A non-threaded bore 63 is formed through the face driver 60. The face driver bore 63 is co-axially aligned with the shank bore 45 and the central aperture 56 formed through the cross 55. A cylindrical center 65 is disposed in the bore 45, the aperture 56, and the bore 63 for axial sliding movement. The forward end of the center 65 terminates in a conical tip 66. As with the first embodiment shown in FIG. 1, the tip 66 is normally positioned forwardly of a transverse plane defined by the teeth 62 of the face driver 60.

The assembly 40 of the second embodiment functions in much the same fashion as the assembly 10 of the first embodiment. The workpiece 30 is moved such that the teeth 62 of the face driver 60 engage the end face of the workpiece 30. Thus, rotation of the shank 41 is imparted through the first yoke 50, the cross 55, the second yoke 52, and the face driver 60 to the workpiece 30. The universal joint connection formed by the first yoke 50, the cross 55, and the second yoke 52 permits the yoke 50 and 52 to rotate about respective axes which are not aligned. Thus, the assembly 40 of the second embodiment is well suited for use when the end surface 30a of the workpiece 30 is not formed very closely perpendicular to the axis of rotation thereof. In this instance, the second yoke 52 will be angled relative to the first yoke 50 to permit the teeth 62 to securely engage the end face 30a.

In the second embodiment, the shank 41 and the first yoke 50 have been shown as separate members, as have the second yoke 52 and the face driver 60. It will be appreciated that the shank 41 can be formed integrally with the first yoke 50, as can the second yoke 52 and the face driver 60. However, by forming the second yoke 52 separate from the face driver 60, the face driver 60 can be replaced as necessary without replacing the second yoke 52. This can result in monetary savings, since the teeth 62 wear during use and, therefore, needs to be replaced more often than the second yoke 52. By the same reasoning, the face driver 20 of the first embodiment may be formed from two separate pieces to permit economical replacement of the teeth 22.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A face driving center assembly adapted for use in a lathe comprising:

a shank adapted to be secured to the lathe for rotation thereby;

a face driver including a forward surface having a plurality of workpiece-engaging teeth formed thereon, said face driver including a bore formed therethrough;

means for connecting said face driver to said shank for rotation therewith, said means for connecting permitting pivoting movement of said face driver relative to said shank while preventing relative axial movement therebetween and including a first yoke connected to said shank, a second yoke connected to said face driver, and a cross connected between said first and second yokes;

a center slidably mounted in said face driver bore; and means for biasing said center forwardly to engage and guide the workpiece as it is installed in the lathe.

2. The invention defined in claim 1 wherein said cross has an aperture formed therethrough which is co-axially aligned with said face driver bore, and wherein a portion of said center extends into said cross aperture.

3. The invention defined in claim 2 wherein said means for biasing includes a pin slidably mounted in said shank bore and means for urging said pin against said center to forwardly bias said center.

4. The invention defined in claim 3 wherein said means for urging includes a spring disposed in said shank bore.

5. The invention defined in claim 3 further including means for limiting the movement of said pin within said shank bore.

6. The invention defined in claim 5 wherein said means for limiting includes an internal shoulder formed within said shank bore and an outer shoulder formed on said pin which engages said internal shoulder.

7. The invention defined in claim 1 wherein said teeth are formed in the shape of tetrahedrons.

8. The invention defined in claim 1 wherein said teeth are formed in the shape of pyramids.

* * * * *